United States Patent

[11] 3,540,556

[72] Inventors Joseph B. Snoy;
  Michael E. Gill; Basil White, Rockford, Illinois
[21] Appl. No. 781,385
[22] Filed Dec. 5, 1968
[45] Patented Nov. 17, 1970
[73] Assignee Twin Disc, Incorporated
  Racine, Wisconsin
  a corporation of Wisconsin

[54] TRANSMISSION WITH REVERSAL INHIBITOR AND AUTOMATIC VEHICLE SPEED RESPONSIVE BRAKE
  3 Claims, 10 Drawing Figs.
[52] U.S. Cl. .................................................. 192/4,
  103/35, 188/181, 188/264, 192/51, 192/87.19, 74/404
[51] Int. Cl. ..................................................... F16h 57/10
[50] Field of Search .......................................... 192/4A,
  4R, 3.5FP, 3.5FPE; 74/13Cur, 339Cur

[56] References Cited
UNITED STATES PATENTS

| | | | |
|---|---|---|---|
| 3,003,606 | 10/1961 | Hindmarch .................... | 192/4 |
| 3,169,616 | 12/1965 | Hunsaker et al. ............. | 192/4 |
| 3,348,644 | 10/1967 | Hilpert ......................... | 192/4 |
| 3,400,790 | 9/1968 | Ruhl et al. .................... | 192/4X |
| 3,437,184 | 4/1969 | Wilson ......................... | 192/4 |

Primary Examiner—Benjamin W. Wyche
Attorney—James E. Nilles

ABSTRACT: A change speed gear mechanism for a vehicle whose direction must be periodically reversed and including a fluid operated brake at the output of the transmission for facilitating the shifting of the gears. A pump driven by the vehicle operates an inhibitor valve so that when the vehicle is moving in one direction, the gear mechanism cannot be operated to drive in an opposite direction until the vehicle has slowed to a safe speed. When the inhibitor valve is preventing transmission reversal, it supplies fluid pressure via a brake control valve to the vehicle brakes. The brake control valve includes valve means responsive to the pump speed and pressure to prevent the brakes from being applied by the inhibitor valve when the vehicle is moving above a predetermined speed.

Patented Nov. 17, 1970

INVENTORS:
J. B. SNOY
M. E. GILL
B. WHITE
BY: James E. Nilles
ATTORNEY

Patented Nov. 17, 1970

INVENTORS:
J. B. SNOY
M. E. GILL
B. WHITE

BY: James E. Nilles
ATTORNEY

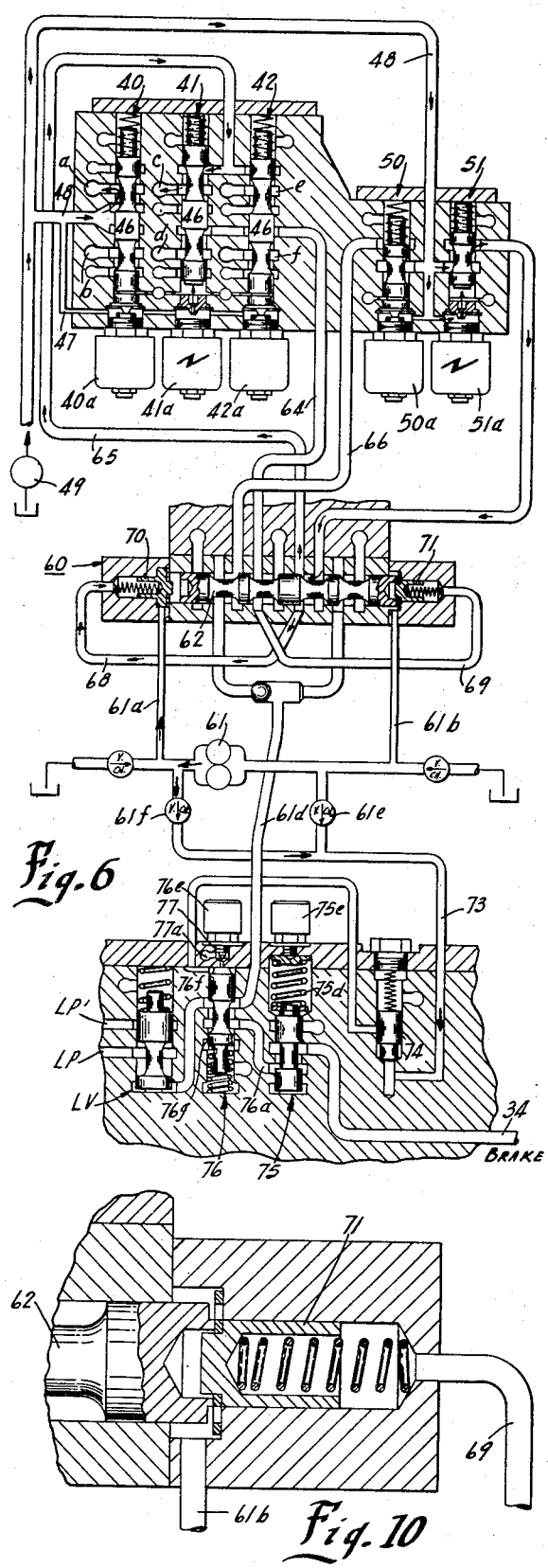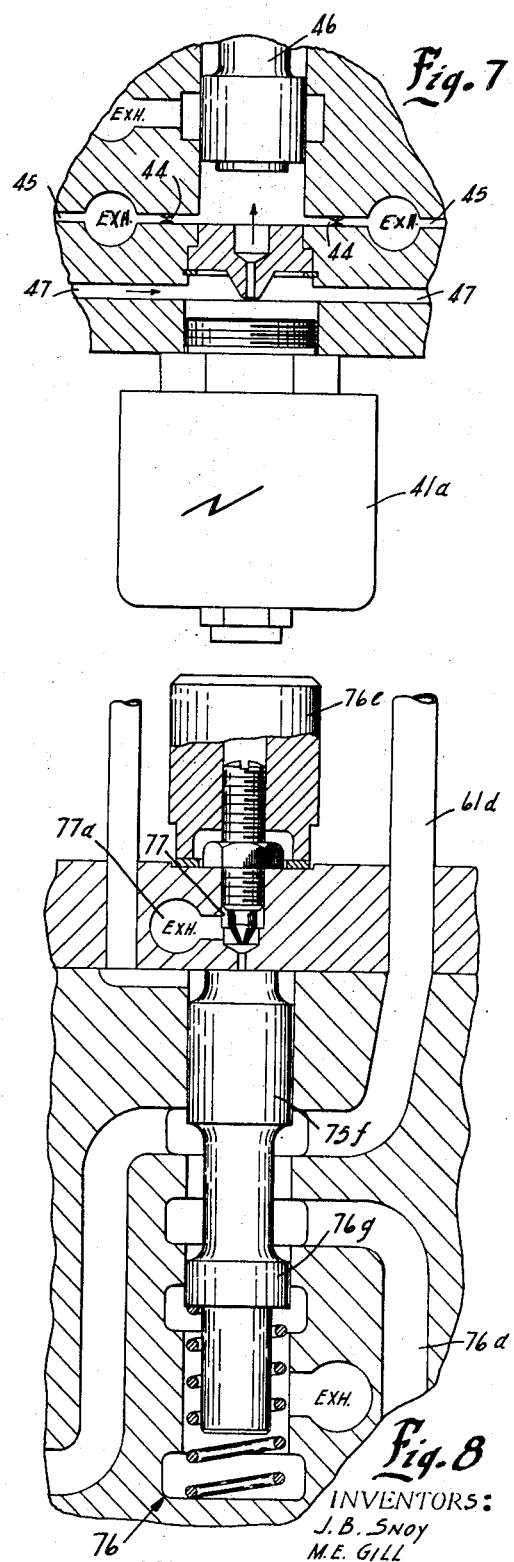

3,540,556

TRANSMISSION WITH REVERSAL INHIBITOR AND AUTOMATIC VEHICLE SPEED RESPONSIVE BRAKE

BACKGROUND OF THE INVENTION

The invention pertains to change speed transmissions for a vehicle such as a tractor, earth working equipment, or the like in which the direction of movement of the vehicle must be changed from time to time. These vehicles are usually of considerable weight and when their direction of movement is to be changed, a considerable momentum load due to the inertia of the vehicle is thrown on the gear system. It has heretofore been necessary to make the gears and their associated clutches of extremely heavy construction so as to withstand these loads. Vehicles of the type to which the present invention relates have change gear speed transmissions which are actuated by fluid operated friction clutches. Hydraulic control circuits are provided for the sequential operation of the various gear combinations.

SUMMARY OF THE INVENTION

The present invention provides a gear change transmission in which the desired combination of gears is selected by the operation of hydraulically operated clutches and include gear sets for reversing the direction of the vehicle. A fluid operated brake is located at the output of the transmission and a hydraulic control system is provided for actuating the clutch and the brake in timed relationship with one another so that the vehicle is brought down to a predetermined speed by operation of the brake and before the actual reversal of the direction of the vehicle can occur. A more specific aspect of the invention relates to an inhibitor valve in the control system which insures the proper sequential operation thereof. The invention also contemplates the use of a brake control valve, an adjustable orifice, and a brake pressure relief valve which prevents engagement of the brake at speeds above the said predetermined maximum.

These and other objects and advantages of the present invention will appear more fully as this disclosure progresses, reference being had to the accompanying drawings.

BRIEF DESCRIPTION OF THE DRAWINGS

FIG. 6 is a diagram similar to FIG. 5 and showing the position of the valve parts when the reversal of the vehicle has been completed and it is actually moving in the reverse direction;

FIG. 7 is an enlarged, fragmentary, cross-sectional view showing a portion of the valve shown in FIG. 6;

FIG. 8 is an enlarged, detail view of the brake control valve and adjustable orifice shown in FIGS. 1 and 6;

FIG. 10 is an enlarged detail view of one end of the inhibitor valve, both ends being similar.

DESCRIPTION OF THE PREFERRED EMBODIMENT

Figure 1:
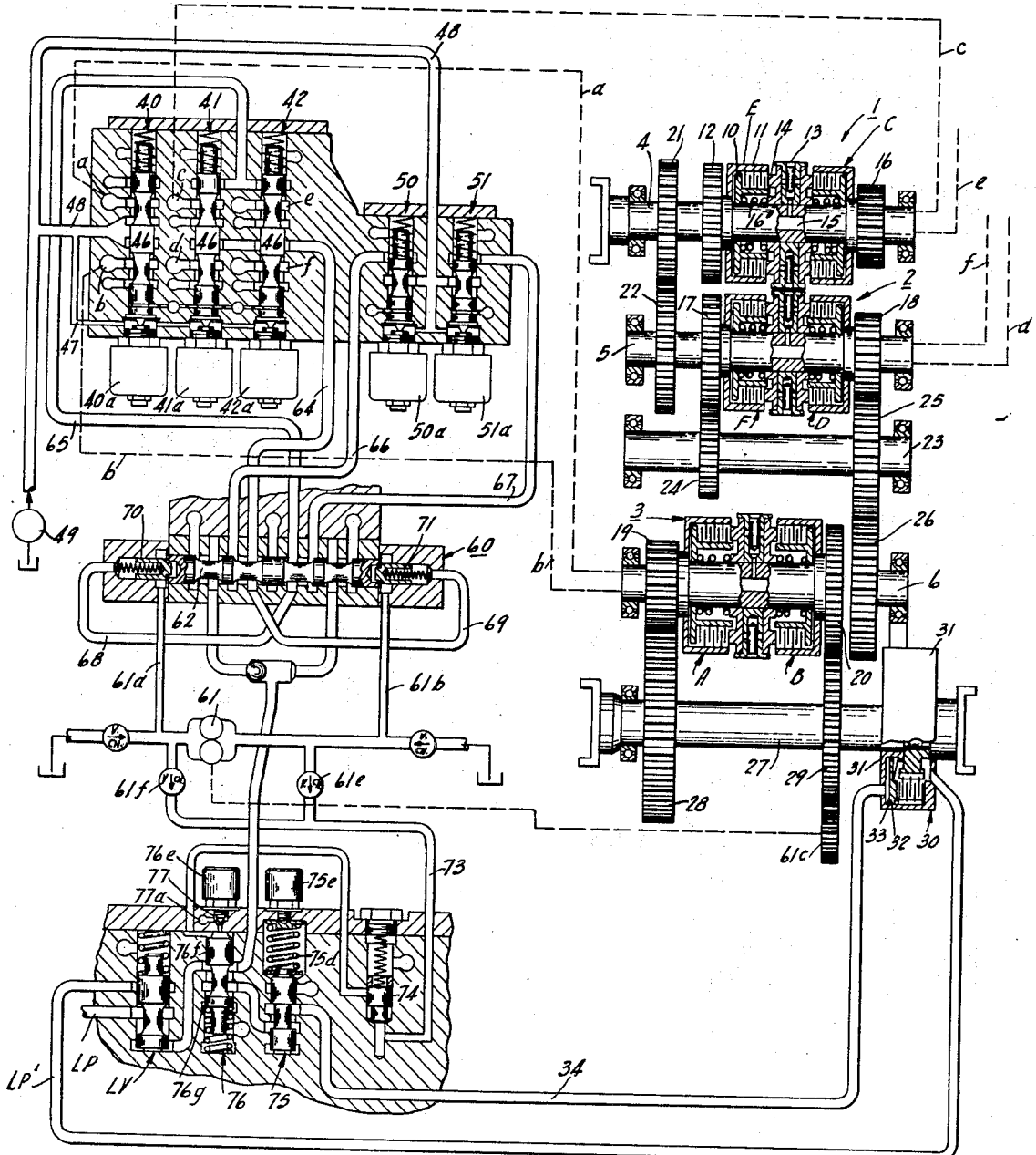
FIG. 1 is a schematic diagram showing the gear change mechanism and the hydraulic control system therefor and made in accordance with the present invention.
Figure 9:
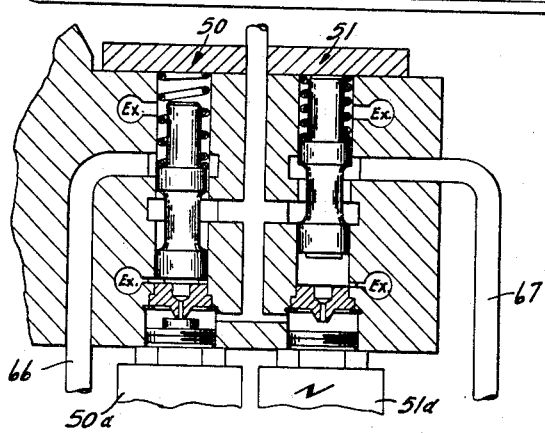
FIG. 9 is an enlarged fragmentary view of the direction valves.

In vehicles of the type in which the present invention finds particular utility, such as in earth working equipment or tractors wherein frequent reversing of the vehicle is required, the hydraulic actuated clutches of the gear change mechanism must absorb and dissipate the energy required to bring the vehicle to a complete stop as well as absorbing the energy required to synchronize the internal rotating parts, and consequently the clutches must be of considerable size and strength.

The gear change mechanism includes three conventional duplex clutches 1, 2 and 3 which may be of the type shown generally in the U.S. Pat. No. 3,243,026 issued Mar. 29, 1966. These duplex clutches 1, 2 and 3 are of similar construction and are mounted, respectively, on the input shaft 4, the shaft 5, and the shaft 6. These clutches have been shown in cross section and a brief description of one is believed to suffice as a description for the other clutches because of their similarity.

The duplex clutch 3 includes individual clutches A and B, duplex clutch 2 includes clutches D and F, while duplex clutch 1 includes clutches E and C.

Referring to clutch E by way of example, it includes hub 10 fixed to shaft 4, a drum member 11 which is rigidly fixed to a gear 12. Gear 12 in turn is rotatably journaled on the shaft 4. Conventional interleaved clutch plates are provided between the drum and hub so that when fluid pressure is applied through the central fixed reaction member 13, the piston 14 of clutch E is extended to clamp up the clutch plates. If a detailed description of reaction member 13 and its valving is deemed desirable, reference may be had to the copending U.S. application Ser. No. 784,713 filed Dec. 18, 1968, entitled "Hydraulically Actuated Clutch Having a Two Piece Feed Back Dump Valve". This causes the shaft 4 and its hub 10 to cause driving engagement of the gear 12. The clutch is released when pressure fluid is no longer admitted to the conduit means 15 formed in shaft 4 and reaction member 13. The spring 16' positively separates the plates to completely disengage the clutch. It will be understood that the operation of the other individual clutches are similar and it is only believed necessary to say that clutches C, F, D, A and B have gears 16, 17, 18, 19 and 20, respectively, fixed to their drums.

The transmission also includes gear 21 fixed to the input shaft 4, gear 22 fixed to shaft 5, a shaft 23 having gears 24 and 25 fixed thereon, gear 26 fixed to shaft 6, and an output shaft 27 having gears 28 and 29 fixed thereon. As shown in the schematic layout view of the gear train in FIG. 1, gears 21 and 22 are in constant mesh, gears 17 and 24 are in constant mesh, gears 18, 25 and 26 are in constant mesh, gears 19 and 28 are in constant mesh, and gears 20 and 29 are in constant mesh.

As various combinations of clutches are selectively engaged by actuating of valves to be referred to, various gear ratios both in the forward and rear direction are provided for the transmission as shown in the following chart, showing the gears used with the various speed ranges:

| Range | Gears used |
|---|---|
| Forward: | |
| 1st | 21, 22, 18, 25, 26, 19 and 28. |
| 2d | 21, 22, 17, 24, 25, 26, 19 and 28. |
| 3d | 21, 22, 17, 24, 25, 26, 20 and 29. |
| Reverse: | |
| 1st | 16, 25, 26, 19, 28. |
| 2d | 12, 14, 25, 26, 19 and 28. |
| 3d | 12, 24, 25, 26, 20 and 29. |

A hydraulically actuated, friction plate brake 30 is provided between the output shaft 27 and the housing 31 of the transmission and includes an actuating piston 32 shiftable in the cylinder 33 formed in the housing. Fluid conduit means 34 conducts pressure fluid to the cylinder 33 so as to pressurize the latter to cause movement of the piston and consequent brake engagement.

HYDRAULIC CONTROL CIRCUIT

The hydraulic control circuit includes three range selector valves 40, 41 and 42 of the solenoid actuated, spring return, spool type. An orifice 44 (see FIG. 7) is provided in the discharge passage 45 leading from each spool 46 of the valves. Pilot pressure is fed via passage 47 to the end of the spools, and fluid pressure is also introduced to the valve 40 via conduit 48 from a conventional pressure source, such as the fluid pump 49.

The clutches are in fluid receiving communication with their valves which have been indicated by dotted lines (FIG. 1). Clutches A and B are in communication with valve 40 through conduits a and b; clutches C and D are in fluid receiving communication with valve 41 via conduits c and d. Clutches E and F are in fluid receiving communication with valve 42 via conduits e and f. As will more fully appear, selective energization of the solenoids 40a, 41a or 42a causes their respective spools to shift thereby causing actuation of their respective fluid operated clutches.

The hydraulic circuit also includes a pair of solenoid operated, spool type, spring returned, direction valves 50 and 51. Valve 50 is the forward direction valve and is actuated by its solenoid 50a, while valve 51 is the reverse direction valve and is actuated by energization of its solenoid 51a. Fluid pressure is delivered to these valves from the previously mentioned supply conduit 48.

An inhibitor valve 60, inhibits or provides engagement of a directional clutch (for example reverse first range) if the vehicle is moving at an undesirably high speed in the opposite direction (for example, forward).

The inhibitor valve 60 is provided in the circuit and is of the spool type, spring returned to neutral. An inhibitor pump 61 can pressurize either end of the spool 62 of the valve via conduit 61a and 61b depending on which direction the pump is rotating, as will appear. The direction of pump rotation depends on the direction of vehicle movement, that is, either forward or backward. For example, when the vehicle is moving forward, the inhibitor pump 61 pressurizes the right hand side (as viewed in FIG. 2) of the spool, thereby shifting it to the left. The valve 60 is connected by conduit 64 with the range selector valves 41 and 42 for conducting pressure fluid to clutches D or F. Conduit 65 connects valve 60 with valves 41 and 42 for conducting pressure to clutches C or E. Conduits 66 and 67 conduct fluid from the range valves 50, 51, respectively to the inhibitor valve 60.

The valve 60 has conduits 68 and 69 connecting the outer ends of its spring loaded pistons 70 and 71, respectively, with conduits 65 and 64. Thus when the spool 62 has been shifted to the left, (FIG. 2) as previously mentioned by pressure in conduit 61b, pressure fluid also flows, as indicated by the arrows in FIG. 2, from the pump 49, through range valve 50 (solenoid 50a being energized), through conduit 66, through valve 60, conduit 64 to range selector valves 41 and 42, and it also flows via conduit 69 to the right end of valve piston 71 to urge the latter to the left, shutting off line 61b and pressure from the inhibitor pump.

The inhibitor pump 61 also provides pressure fluid via conduit 73 to a brake pressure relief valve 74, to be described.

The circuit also includes a brake apply valve 75 and brake control valve 76 having an adjustable orifice 77 which are dumped to exhaust 77a. Pressure fluid is delivered from the inhibitor valve 60 via conduit 61d to the brake control valve 76 and is then conducted via conduit 76a to the brake apply valve 75. Brake apply valve is a regulator and if the vehicle speed is not excessive, it will permit pressure fluid to flow to the brake. As will appear, the brake pressure relief valve 74, brake control valve 76 and the adjustable orifice 77 function, in certain vehicle installations, to prevent the engagement of the output brake 30 at vehicle speeds above a predetermined maximum, say for example, 8 miles an hour.

The inhibitor pump 61 is driven off the transmission output, as for example, its gear 61c (FIG. 1) being driven by gear 29 on output shaft 27. Consequently, as the vehicle slows down, the pump slows down and as the vehicle speeds up, so does the pump 61. As previously mentioned, the direction of pump rotation depends on the direction of vehicle movement.

As mentioned, the brake apply valve 75 is a regulator valve and serves to regulate the rate of deceleration of the vehicle by controlling the brake apply pressure to the brake via brake line 34. For example, if the pressure on the brake is excessive, the spool of valve 75 shifts up (as viewed in the drawings). The spring 75d is manually adjustable by knob 75e to the desired brake pressure.

Reference will now be made to different stages of vehicle operation as shown by the control circuit in FIGS. 2 to 6.

FIGURE 2

Figures 2, 3:
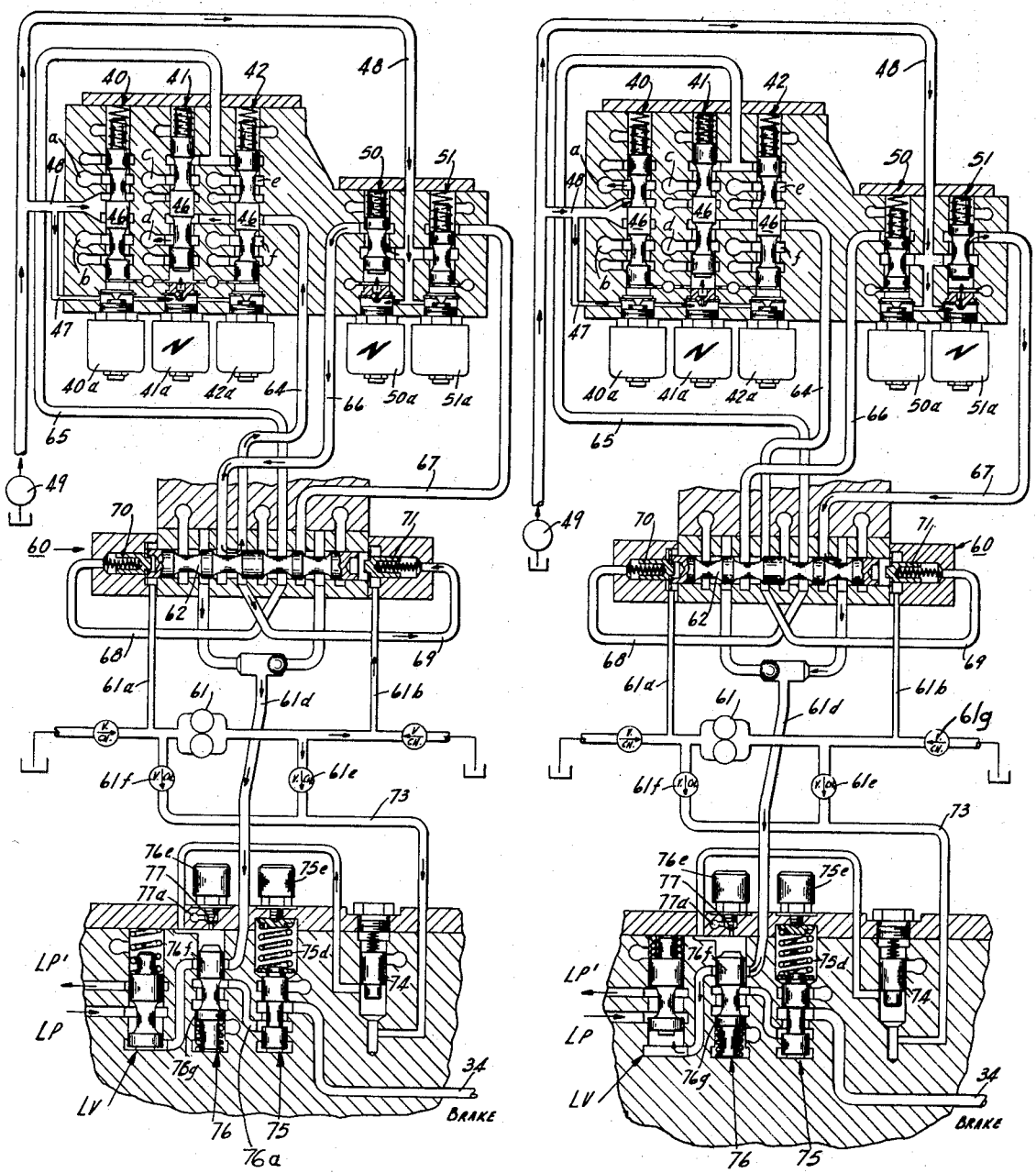
FIG. 2 is a diagram of a hydraulic circuit, part of which is shown in FIG. 1, and showing the position of the various valves when the transmission is operating in the first range forward.
FIG. 3 is a view similar to FIG. 2, but showing the position of the parts when the gears have been shifted to a position of first range reverse and wherein the vehicle is still moving in a forward direction.

FIG. 2 shows the transmission operation in first range forward, range solenoid 41a and direction solenoid 50a being energized by the operator to shift the spools of valves 41 and 50 in an upward direction to the positions shown. Clutches A and D are engaged to give a first range forward speed. Forward movement of the vehicle causes the inhibitor pump 61 to pressurize the right hand end of valve 60 and also the upper side of the brake control valve 76, as indicated by the fluid flow arrows. In this position valve 76 blocks flow of fluid to the brake.

FIGURE 3

Now suppose the operator desired to reverse the direction of the vehicle as shown in FIG. 3, the operator energizes the reverse solenoid 51a raising it and permitting pressure fluid to flow via conduit 67. The vehicle's forward speed is still greater than the maximum predetermined speed at which it is desired to have the brake 30 operate, consequently, the spool brake control valve 75 is held down by its spring, fluid being blocked from it by valve 76. As the vehicle is still moving forward, the inhibitor pump 61 still pressurizes the right hand end of inhibitor valve 60, thereby main fluid pressure is blocked from the range valve and is directed (as indicated by the arrows) to the brake control valve 76 via conduit 61d. At this time, fluid is also directed to the underside of a lubrication control valve LV, which forces the spool upwardly and permits flooding of the brake with lubrication pressure fluid via passage LP from a pressure source (not shown) through the valve LV and then through conduit LP' to the area of the brake containing the brake plates. In this manner, lubrication and cooling of the brake is assured.

The pressure at the discharge of the inhibitor pump 61 is a function of pump speed and the size of an orifice in check valve 61g, together with the size of the adjustable orifice 77 at the upper end of the brake control valve 76.

The purpose of the brake pressure relief valve 74 is to "cut in" the adjustable orifice 77 above a predetermined vehicle speed. This serves to flatten the curve of the discharge pressure versus pump speed, which curve would otherwise follow an exponential value and rise sharply at the higher speeds.

Thus, as shown in FIG. 3, pressure fluid is still blocked from the brake 30 by the spool of the brake control valve 76.

FIGURE 4

Figures 4, 5:
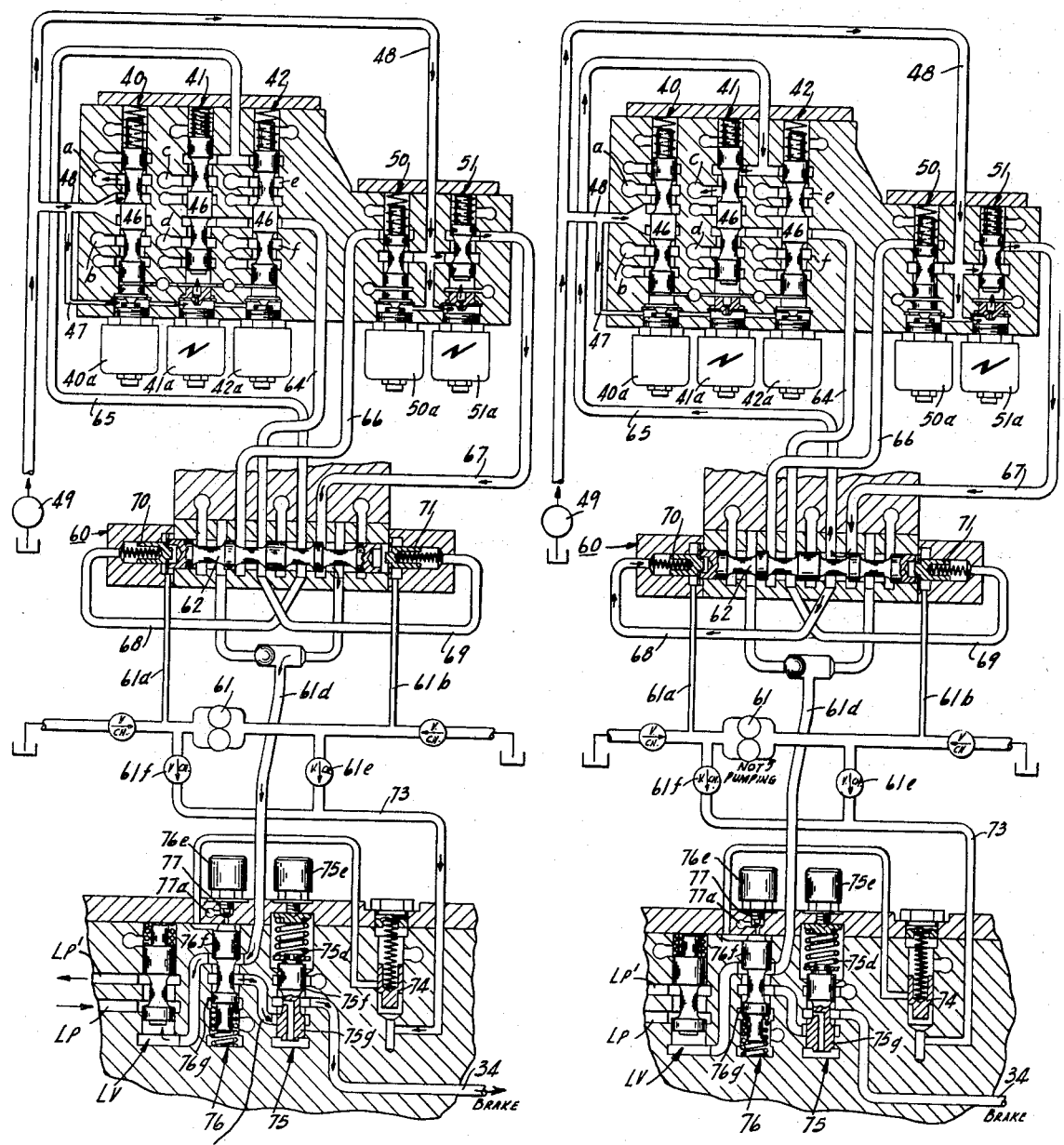
FIG. 4 is a view similar to FIG. 3, and showing the position of the valve parts when the vehicle speed has diminished to a point where it is desirable and safe to apply the brake.
FIG. 5 is a view similar to FIG. 4, but showing the position of the valve parts when the forward speed of the vehicle has diminished sufficiently to permit actual reverse movement of the vehicle.

Assume the vehicle speed has dropped to the predetermined value where it is desired to apply the brake as shown in FIG. 4, the spring under the spool of the brake control valve 76 forces the spool upward against the reduced discharge pressure of the inhibitor pump 61. This permits pressure fluid to flow through the brake apply valve 75, through conduit 34 and brake piston 32 to apply the brake.

It should be noted that the upper land 75f of valve 75 is slightly larger in diameter than the bottom land 75g whereby as the upper land cracks open to main pressure from conduit 76a, an additional upward force acts on the spool to cause it to shift quickly, that is it snaps rapidly upwardly rather than moving slowly with an undesirably throttling action.

Thus, the brake apply valve 75 acts as a regulator to permit adjusting the pressure admitted to the brake and consequently adjusts the braking rate.

In this manner, due to the action of the brake control valve 76, adjustable orifice 77, and the brake pressure relief valve 75, when the speed of the vehicle has dropped to the predetermined value, say 8 miles per hour, the brake is applied.

FIGURE 5

After the forward speed of the vehicle has been slowed down sufficiently to permit actual reverse direction of the vehicle, the inhibitor pump discharge pressure has correspondingly dropped sufficiently to permit the spring at the left end of the inhibitor valve 60 to force the valve spool to the right where its land cuts off the main pressure from the brake and admits pressure to the range clutch C via conduit 65. That is, reverse solenoid 51a has been energized and pressure flows through valves 51 and 60 to the first reverse clutch C, as indicated by the arrows. Engagement of clutch C causes the vehicle to move in the reverse direction.

It will be noted also that main fluid pressure has been admitted via conduit 68 to the left hand end of valve piston 70 to thereby cause the spool 62 of valve 60 to quickly shift or "snap" to the right, rather than move with a throttling action.

FIGURE 6

This view shows the shift reversal completed and the vehicle moving in the reverse direction. The inhibitor pump is rotating in opposite direction from that shown in FIG. 2, pressurizing the left end of valve 60 to shift it opposite to the FIG. 2 position. Pressure is also delivered through the left check valve 61f to the relief valve 74.

RESUME

The present invention permits the use of a transmission, including its clutches, having normal range changing and torque carrying capacities, and which can handle the high energy of stopping the vehicle by incorporating an adequately cooled brake in the output of the transmission. The engaging and disengaging of the brake is automatically controlled when the operator reverses vehicle direction.

We claim:

1. In a vehicle transmission having a plurality of selectively engagable, hydraulically actuated friction clutches for selection of various gear ratios in forward and reverse directions of the vehicle, a hydraulically actuated brake located adjacent the output of said transmission for stopping the movement of the vehicle, and hydraulic control means for causing selective operation of said clutches and also operation of said brake whereby when the vehicle direction is to be reversed, said brake is actuated to slow the vehicle speed prior to reverse movement of the vehicle; said hydraulic control means including, selector valves in fluid communication with said clutches, direction valves for selection of vehicle direction, an inhibitor valve in fluid communication with and between said (1) selector and direction valves and (2said brake whereby said brake is actuated prior to reverse movement of said vehicle, a brake control valve, a brake pressure relief valve for admitting fluid to said brake control valve, and an adjustable orifice in communication with said brake control valve for varying the amount of fluid pressure acting on the latter, whereby the brake cannot be engaged at vehicle speeds over a predetermined value.

2. The transmission in accordance with claim 1 including an inhibitor fluid pump driven at a speed and direction directly related to speed and direction of the vehicle, said pump being in fluid delivering communication with said inhibitor valve for shifting the latter to a brake actuating position when the vehicle speed drops below a predetermined maximum.

3. In a vehicle transmission having a plurality of selectively engagable, hydraulically actuated friction clutches for selection of various gear ratios in forward and reverse directions of the vehicle, a hydraulically actuated brake located adjacent the output of said transmission for stopping the movement of the vehicle, hydraulic control means for causing selective operation of said clutches and also operation of said brake, said hydraulic control means including an inhibitor valve in fluid communication with said brake, and a fluid pump driven by said transmission and at a speed and direction directly related to speed and direction of the vehicle, said pump being in fluid delivering communication with said inhibitor valve for shifting the latter to a brake actuating position, said control means also including a brake control valve, a pressure relief valve for admitting fluid to said brake control valve, and an adjustable orifice in communication with said brake control valve for varying the amount of fluid pressure acting on the latter, whereby the brake cannot be engaged at vehicle speeds over a predetermined value.